Patented Aug. 28, 1923.

1,466,147

UNITED STATES PATENT OFFICE.

SERENO G. NORTON, OF KENVIL, NEW JERSEY, ASSIGNOR TO HERCULES POWDER COMPANY, OF WILMINGTON, DELAWARE, A CORPORATION OF DELAWARE.

EXPLOSIVE.

No Drawing.　　　Application filed July 11, 1922. Serial No. 574,303.

*To all whom it may concern:*

Be it known that I, SERENO G. NORTON, a citizen of the United States, residing at Kenvil, county of Morris, and State of New Jersey, have invented a new and useful Improvement in Explosives, of which the following is a full, clear, and exact description.

My invention relates to those known explosives containing nitro sugar which are rendered stable by dissolving sugar in glycerine, subjecting the solution to the action of mixed nitric acid and sulfuric acid so as to nitrate both the glycerine and the sugar, removing the spent or waste acid by washing with water and then treating the mixture of nitrated sugar and trinitroglycerine with a solution of sodium carbonate, or a known equivalent alkali, in water.

It is known that certain substances containing sugar do not give satisfactory results, and they produce a gummy, sticky mass which cannot be properly washed with soda to stabilize it. The sugar that has heretofore given the most satisfactory results is cane sugar. However, the solution of sugar and glycerine is comparatively viscous, causing difficulties in the practical working of the process. In the unnitrated liquid, there is trouble in draining out the drums, tanks and pipe lines, in feeding into the nitrator regularly, and in distributing through the body of the acid in the nitrator. High viscosity of the nitrated liquid gives trouble in washing with water and alkali, in the slow settling from these washes, and in flowing down the gutters used for transportation from one house to another. Moreover, as an important object of dissolving any kind of sugar in glycerine is a reduction in the cost of the nitrated liquid, it is clear that it is ordinarily desirable to add as much sugar as possible. In the case of cane sugar, it is impracticable, due to the viscosity limitation, with the usual apparatus, to add more than about 25% sugar to 75% glycerine. Even with a special apparatus, 25% sugar seems to be the practicable maximum.

It is obvious, therefore, that if any form of sugar could be substituted for cane sugar that, added in equal proportion, would cheapen the product without increasing the viscosity or reducing the yield of nitrated compounds; or if an equally cheap, or even slightly more expensive, form of sugar were available that could be added in substantially larger proportion without producing a more viscous solution; in either case, the product would have distinct commercial advantages.

I have discovered that a known form of sugar possesses both of the advantages over cane sugar above specified; that is, it can be produced at a cost much less than the cost of cane sugar and a larger quantity of the same can be dissolved in a given amount of glycerine and give a solution that is less viscous than the solution of glycerine and cane sugar. The process of manufacture may be the same as in the manufacture of trinitroglycerine and nitrated cane sugar, and no difficulties are encountered in the alkali washing or other treatments.

The sugar that I have discovered to possess the advantages specified is laevo-xylose, having (probably) the following composition:

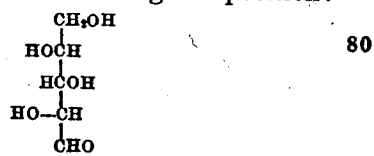

The nature, sources and modes of extraction of l-xylose are known and need not be herein specifically set forth. It may be mentioned, however, that it can be economically prepared by the acid hydrolysis under pressure of wood chips, sawdust, corn cobs, or similar bodies containing cellulose; and after neutralization of the solution the xylose sugar will crystallize out.

When the xylose is prepared, the procedure may be the same as in the manufacture of the nitrated cane sugar—trinitroglycerine mixture. The xylose is dissolved in glycerine and the solution subjected to the action of the mixed acids. The liquid so obtained is settled to separate the nitro compounds which are then washed with water and then with a solution of sodium carbonate of suitable strength. The alkali solution is then drawn off and discarded.

Variations of this procedure are permissible. The xylose and glycerine may be introduced into the nitrator simultaneously before they have formed a solution, or they may be introduced into the mixed acids separately. The acids may be of various proportions and of various strengths and they may or may not contain water. The proportions of xylose, glycerine and acids, the alkaline agents, the strengths of the alkali, and the temperatures, may be varied. It may also be stated that a larger or smaller proportion of xylose than will actually dissolve in the glycerine without producing a highly viscous solution may be added thereto, although the full advantage of my invention cannot be availed of unless there is added about the maximum proportion of xylose capable of so dissolving in the gylcerine without producing an objectionably viscous solution. It has been found that a solution of 35-40% xylose and 60-65% glycerine is far less viscous than a solution of cane sugar and glycerine of the same proportions, with consequent advantages in respect to working and to cheapening of the product; while the product may be still further cheapened, without producing a high degree of viscosity, by using a substantially larger proportion of xylose.

I may substitute for glycerine a glycol or a mixture of glycols, such as ethylene and propylene glycols; and in specifying glycerine in the claims I do not mean to exclude the glycols as equivalents.

It will also be understood that my invention would not be departed from if some ingredient not specified were incorporated in the composition, as, for example, if some cane sugar or other form of sugar were added, or if starch were suspended in the glycerine, so long as xylose were used in substantial proportions.

The following is a typical method of procedure.

Four parts of xylose are dissolved in six parts of glycerine. Twenty parts of the solution is nitrated with about 100 parts of a standard mixture of acids: nitric, 45%; sulfuric, 55%. The mixture of trinitroglycerine, nitrated xylose and spent acid after settling from the acids is washed with water and then with a two per cent solution of sodium carbonate, in water, at a temperature of about 80° F. The alkali solution is then drawn off and discarded.

Having now fully described my invention, what I claim and desire to protect by Letters Patent is:

1. An explosive consisting of a stabilized mixture of trinitroglycerine and nitrated xylose.

2. An explosive containing from twenty to forty parts nitrated xylose and from sixty to eighty parts nitroglycerine.

3. An explosive containing forty parts nitrated xylose and sixty parts nitrated glycerine.

In testimony of which invention, I have hereunto set my hand, at Kenvil, N. J., on this 6th day of July, 1922.

SERENO G. NORTON.